United States Patent
Tsou et al.

[11] Patent Number: 5,973,835
[45] Date of Patent: Oct. 26, 1999

[54] MULTILAYER THIN-FILM BROAD-BAND POLARIZING BEAM-SPLITTER

[75] Inventors: Yi-Jen Tsou, Taipei; Cheng-Wei Chu, Taipei Hsien; Fang-Chuan Ho, Hsinchu, all of Taiwan

[73] Assignee: Industrial Technology Research Institute, Hsinchu, Taiwan

[21] Appl. No.: 08/847,632

[22] Filed: Apr. 28, 1997

[30] Foreign Application Priority Data

Nov. 23, 1996 [TW] Taiwan .................................. 85114452

[51] Int. Cl.⁶ .................................................. G02B 5/30
[52] U.S. Cl. ........................... 359/495; 359/497; 359/498
[58] Field of Search .................................... 359/495, 496, 359/497, 498, 583

[56] References Cited

U.S. PATENT DOCUMENTS

| | | | |
|---|---|---|---|
| 2,815,695 | 12/1957 | Scharf et al. ............................ | 359/583 |
| 3,998,524 | 12/1976 | Hubby, Jr. et al. ...................... | 359/496 |
| 4,415,233 | 11/1983 | Itoh et al. ................................ | 359/583 |
| 4,721,368 | 1/1988 | Deguchi et al. . | |
| 4,966,438 | 10/1990 | Mouchart et al. ....................... | 359/583 |
| 5,074,645 | 12/1991 | Gold et al. ............................... | 359/498 |
| 5,400,179 | 3/1995 | Ito ........................................... | 359/583 |
| 5,453,859 | 9/1995 | Sannohe et al. ......................... | 359/498 |
| 5,541,728 | 7/1996 | Dierking . | |
| 5,625,491 | 4/1997 | Von Gunten et al. ................... | 359/498 |
| 5,648,870 | 7/1997 | Mistutake ................................ | 359/496 |
| 5,719,702 | 2/1998 | Decker .................................... | 359/495 |

FOREIGN PATENT DOCUMENTS

| | | | |
|---|---|---|---|
| 0282824 | 12/1986 | Japan ...................................... | 359/495 |
| 0187802 | 8/1987 | Japan ...................................... | 359/583 |

*Primary Examiner*—Ricky D. Shafer
*Attorney, Agent, or Firm*—Sughrue, Mion, Zinn, Macpeak & Seas, PLLC

[57] ABSTRACT

A multilayer thin-film broad-band polarizing beam-splitter which can split an unpolarized beam into two orthogonal linearly polarized beams with high extinction ratios is provided. The fabrication method comprises: (1) selecting a right-angle prism, having an isosceles triangular cutoff plane; (2) depositing broad-band polarized multilayer thin-film on an internal slope of the right-angle prism; (3) cementing and UV-curing a coated right-angle prism with an uncoated right-angle prism to form a cube-shaped polarizing beam-splitter; (4) properly determining the orientation of the polarization plane of the cube-shaped polarizing beam-splitter; (5) identifying the multi-stage assembly designs that are responsible for beam being incident and emerging; (6) adding anti-reflecting coatings to the relevant faces of the cube-shaped polarizing beam-splitters; and (7) cementing and UV-curing these cube-shaped polarizing beam-splitters.

1 Claim, 5 Drawing Sheets

MULTILAYER THIN-FILM BROAD-BAND POLARIZING BEAM-SPLITTER

BACKGROUND OF THE INVENTION

1. Field of the Invention

The present invention generally relates to a polarizing beam-splitter, and especially relates to a high performance multilayer thin-film broad-band polarizing beam-splitter for obtaining two orthogonal linearly polarized beams with a high extinction ratio from an unpolarized beam of broad spectral range. The absorption loss of the polarizing beam-splitter, made of multilayer thin-film coatings, is negligible because the coating materials used in the thin-film stack are virtually lossless dielectric materials.

2. Description of the Related Art

Thin-film multilayer polarizing beam-splitters are commonly used in contemporary optoelectronic systems. However, most have tradeoffs between high optical throughput and high extinction performance unless they are operated at single wavelength or in a narrow spectral band. Thus, the demand for broad-band polarizing beam-splitters increases as applications across the whole visible range have become increasingly important.

A first related prior art had been disclosured by R. Messner, "Die theoretischen grundlagen optischer interferenzpolarisatoren", Feinwerktechnik 57, 142–147 (1953). The first prior art used 15 plates, each with quarter-wave films coated on both sides, parallel-stacked with air gaps to provide approximately 90% polarized light transmission at an oblique angle of incidence. They are called pile-of-plates polarizers. The first prior art had drawbacks of complicated stacking procedure, larger walk-off of the transmitted light, narrow operating bandwidth, and especially widely-spreaded reflected beams that were not orthogonal to the transmitted beam. The last drawback greatly limited the application of such devices as polarizing beam-splitters.

A second related prior art had been disclosed by H. Schroder, "Die erzeugung von lineraploarisierttem licht durch dunne dielektrische schichten," Optik 3, 499–503 (1948). The second prior art was to operate the pile-of-plates polarizers at a particular angle such that only light with polarization perpendicular to the plane of incidence would be reflected. Though this improved the extinction ratio and resulted in far fewer plates being necessary for equal performance, it still suffered from the same disadvantage of not being able to allow such polarizers to function as polarizing beam-splitters.

A third prior art replaced the multiple plates with thin layers of low refractive index material to enhance the interference effect. The multilayers of high and low-refractive index materials were on a plate or embedded between materials having another suitable refractive index. The bandwidth of these polarizers was much smaller than that of pile-of-plates polarizers. Choice of the refractive indices and angle of incidence had strong influence on the bandwidth and the extinction ratio of thin-film multilayer polarizers. Since broad-band thin-film polarizers are extremely difficult to make, the extinction ratio is traditionally improved by passing the incident radiation through multiple stages of the polarizing process, such as pile-of-plates polarizers, with the expense of optical throughput. However the reflected beams of such polarizers can hardly be combined into a single light beam with orthogonal polarization from the transmitted beam. Therefore, it is not satisfactory to use the above prior art as a polarizing beam-splitter.

SUMMARY OF THE INVENTION

An object of the present invention is to provide a multilayer thin-film broad-band polarizing beam-splitter with low energy loss and ease of fabrication.

Another object of the present invention is to provide a multilayer thin-film broad-band polarizing beam-splitter with an adjustable extinction ratio.

Another object of the present invention is to provide a multilayer thin-film broad-band polarizing beam-splitter suitable for a broad spectral range of, for example, $\lambda_U/\lambda_L \geq 2$ where $\lambda_U$ and $\lambda_L$ are the longest and the shortest operating wavelengths, respectively.

Another object of the present invention is to provide a multilayer thin-film broad-band polarizing beam-splitter with two splitted beams of equal intensity and orthogonal linear polarization states.

DESCRIPTION OF THE DRAWINGS

Other objects, features, and advantages of the present invention will become apparent from the following detailed description made with reference to a non-limiting embodiment. The description is made with reference to the accompanying drawings, in which.

DESCRIPTION OF THE PREFERRED EMBODIMENT

According to U.S. Pat. No. 2,403,731(S. M. MacNeille, "Beam-splitter"), the degree of polarization of a broad-band polarizer is optimal if the following equation is satisfied:

$$n_p \sin \theta_p = n_L n_H/(n_L^2 + n_H^2)^{1/2} \qquad \text{Eq.(1)}$$

where $n_p$ and $\theta_p$ are refractive index and angle of incidence of radiation inside the cubic prism, respectively; $n_L$ and $n_H$ are the refractive indices of the high-index and low-index thin-film materials.

The degrees of polarization of the straight-through beam, $P_T$, and the deviated beam, $P_R$, are defined as $$P_T = |(T_P - T_S)/(T_P + T_S)|$$

$$P_R = |(R_P - R_S)/(R_P + R_S)|$$

where $T_P$, $T_S$, and $R_P$, $R_S$ are the average transmittance and the average reflectance of the light with polarization parallel (p-polarized) and perpendicular(s-polarized) to the plane of incidence. If $P_T$ and $P_R$ approach unity, the extinction ratios, defined as $T_P/T_S$ or $R_S/R_P$, are higher.

According to Eq.(1), an ideal broad-band polarizing cube beam splitter may be designed by properly selecting the prism material and the high- and low-refractive index materials of the thin-film stack.

Figure 1A:
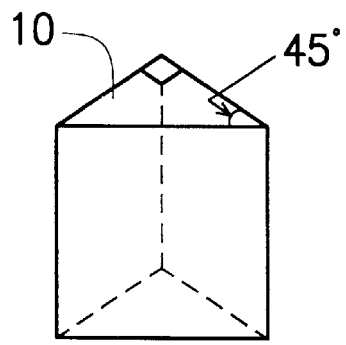
FIG. 1a shows an uncoated right angle prism.
Figure 1B:
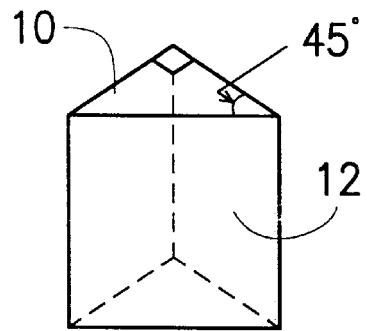
FIG. 1b shows a right angle prism coated with a broad-band polarizing multilayer thin-film stack.
Figure 1C:
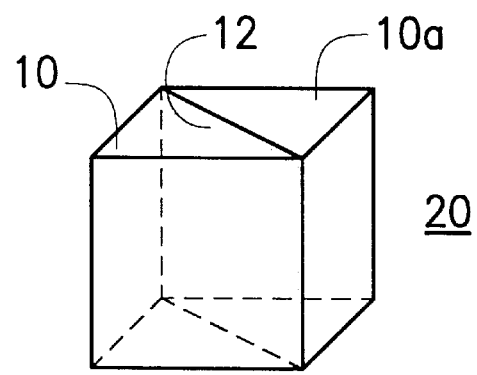
FIG. 1c shows a broad-band polarizing beam-splitter.

Now, referring to FIG. 1a to FIG. 1c, the fabrication method of multilayer thin-film broad-band polarizing beam-splitter comprises: (1) selecting a right-angle prism 10, having an isosceles triangular cutoff plane, as shown in FIG. 1a; (2) depositing broad-band polarized multilayer thin-film 12 on an internal slope of the right-angle prism 10, as shown in FIG. 1b; (3) cementing and UV-curing a coated right-angle prism 10 with an uncoated right-angle prism 10a to form a cube-shaped polarizing beam-splitter 20 as shown in FIG. 1c; (4) properly determining the orientation of the polarization plane of the cube-shaped polarizing beam-splitter 20; (5) identifying the multi-stage assembly designs that are responsible for light incidence and emergence; (6) adding anti-reflecting coatings to the relevant faces of the cube-shaped polarizing beam-splitter 20; and (7) cementing and UV-curing these cube-shaped polarizing beam-splitters.

Figure 2A:
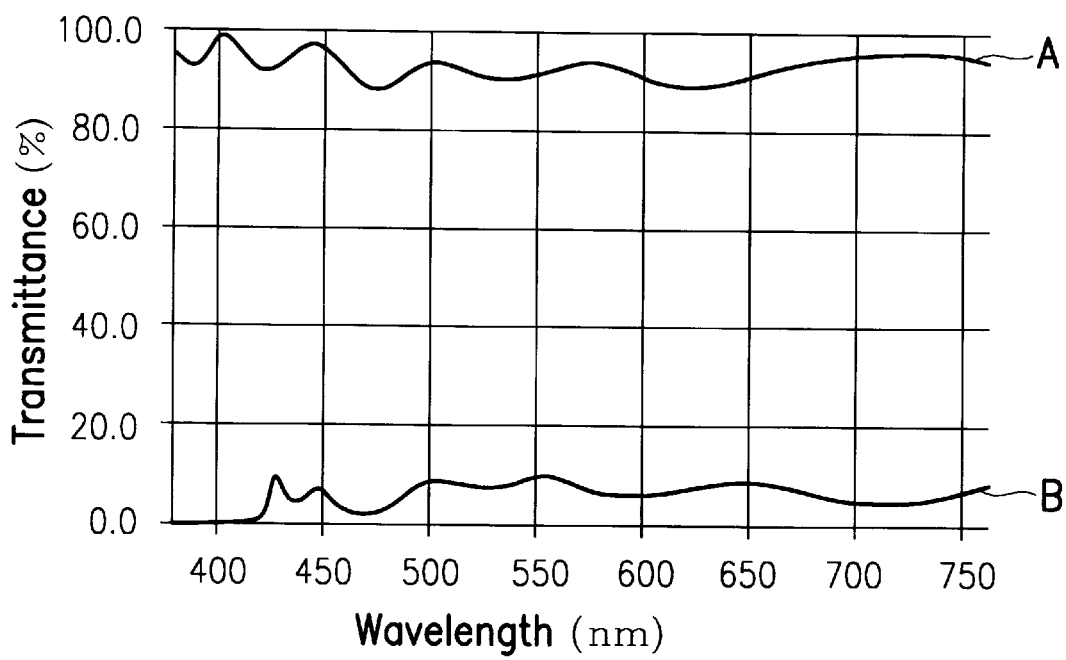
FIG. 2a shows the spectral transmittance of the device shown in FIG. 1c the prism is made of BK7.
Figure 2B:
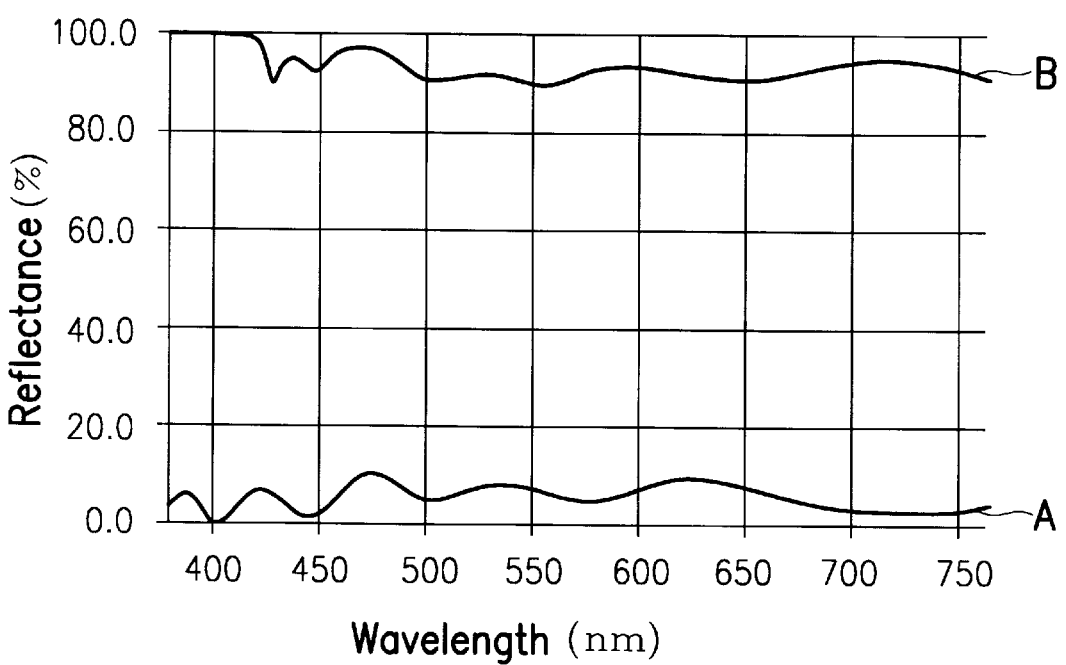
FIG. 2b shows the spectral reflectance of the device shown in FIG. 1c when the prism is made of BK7.

When the right-angle prism 10 is made of BK7, the degrees of polarization of the the polarizing beam-splitter are therefore $$P_T=|(T_P-T_S)/(T_P+T_S)|=|(0.94-0.06)/(0.94+0.06)|=0.88 \quad \text{Eq.(2a)}$$

$$P_R=|(R_P-T_S)/(R_P+R_S)|=|(0.06-0.96)/(0.06+0.96)|=0.88 \quad \text{Eq. (2b)}$$

when the right-angle prism 10 is made of BK7; the incident light is white light; the incidence angle is 45°; the reference wavelength is 460.0 nm; and the broad-band polarized multilayer thin-film coated on the internal slope of right-angle prism 10 is shown as TABLE 1, the spectral transmittance and reflectance are respectively shown in FIG. 2a and FIG. 2b. In FIG. 2a and FIG. 2b, curve A and curve B respectively represent p-polarization and s-polarization. From FIG. 2a and FIG. 2b, it is known that the transmittance of p-polarized of reflectance of s-polarized are both above 90%.

TABLE 1

| LAYER NO. | MATERIAL | THICKNESS(nm) | REFRACTIVE INDEX |
|---|---|---|---|
| SUBSTRATE | BK7 | | 1.52 |
| 1 | TiO$_2$ | 22.94 | 2.29 |
| 2 | MgF$_2$ | 88.44 | 1.38 |
| 3 | TiO$_2$ | 48.88 | 2.29 |
| 4 | MgF$_2$ | 87.38 | 1.38 |
| 5 | TiO$_2$ | 37.70 | 2.29 |
| 6 | MgF$_2$ | 115.90 | 1.38 |
| 7 | TiO$_2$ | 49.81 | 2.29 |
| 8 | MgF$_2$ | 98.99 | 1.38 |
| 9 | TiO$_2$ | 37.19 | 2.29 |
| 10 | MgF$_2$ | 123.48 | 1.38 |
| 11 | TiO$_2$ | 116.46 | 2.29 |
| 12 | MgF$_2$ | 121.53 | 1.38 |
| 13 | TiO$_2$ | 36.43 | 2.29 |
| 14 | MgF$_2$ | 137.70 | 1.38 |
| 15 | TiO$_2$ | 104.19 | 2.29 |
| 16 | MgF$_2$ | 191.68 | 1.38 |
| 17 | TiO$_2$ | 103.24 | 2.29 |
| 18 | MgF$_2$ | 237.15 | 1.38 |
| 19 | TiO$_2$ | 111.86 | 2.29 |
| 18 | MgF$_2$ | 286.46 | 1.38 |
| 21 | TiO$_2$ | 133.54 | 2.29 |

TABLE 1-continued

| LAYER NO. | MATERIAL | THICKNESS(nm) | REFRACTIVE INDEX |
|---|---|---|---|
| 22 | MgF$_2$ | 29.97 | 1.38 |
| INCIDENT MEDIUM | BK7 | | 1.52 |

Figure 3:
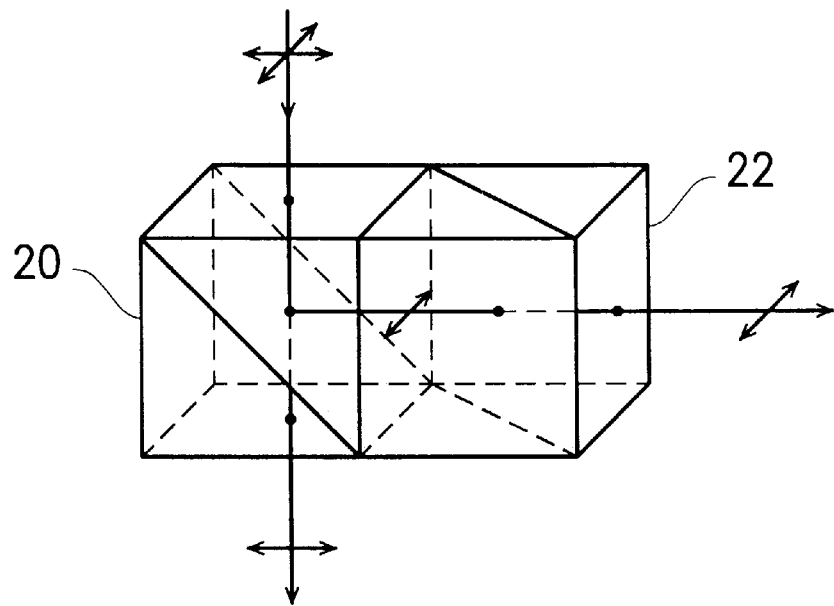
FIG. 3 shows the assembly of two cubic broad-band polarizing beam-splitters shown in FIG. 1c.

As shown in FIG. 3, a second cube-shaped polarizing beam-splitter 22 is placed externally to the first cube-shaped polarizing beam-splitter 20. If the incident plane of the second polarizing beam-splitter 22 is adjacent to the plane of emergence of the reflected beam from the first polarizing beam-splitter 20; and the plane of p-polarization (or s-polarization) of the second polarizing beam-splitter 22 is perpendicular to that of the first polarizing beam-splitter 20, the degree of polarization will be greatly improved while keeping the two beams propagating in orthogonal directions. The spectral transmittance of the beam emerging from the second beam-splitter 22 is given by:

$$T_P'=T_P*R_S=0.94*0.94=0.884$$

$$T_S'=R_P*T_S=0.06*0.06=0.004$$

Therefore, the degree of polarization of the assembly in transmittance is given by:

$$P=P_T=|(0.884-0.004)/(0.884+0.004)|=0.991 \quad \text{Eq(3)}$$

Figure 4A:
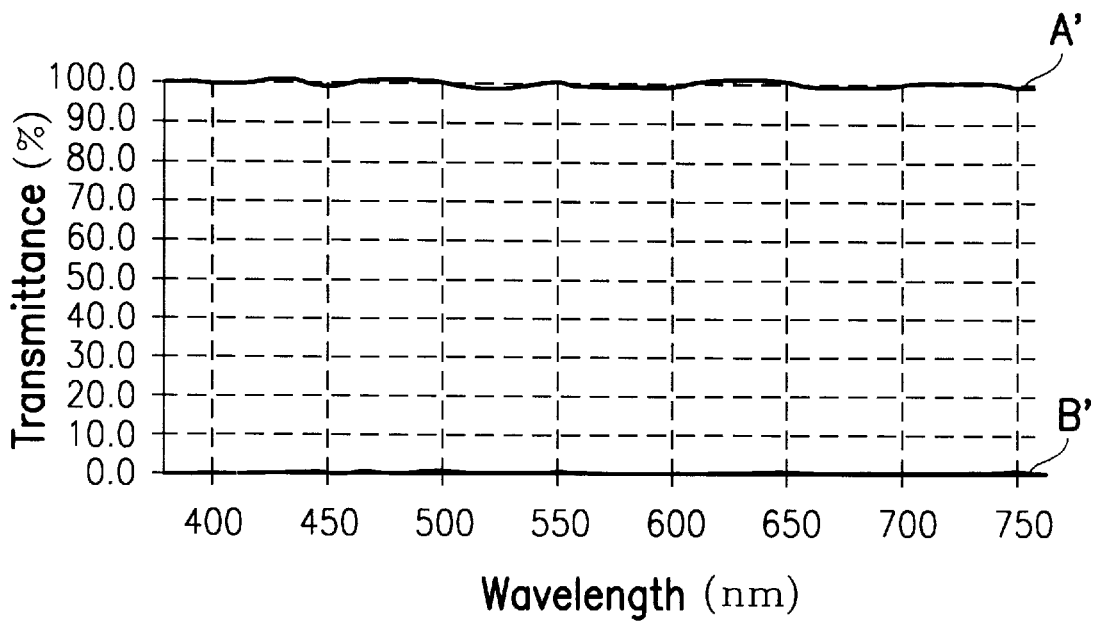
FIG. 4a shows the spectral transmittance of the device shown in FIG. 1c when the prism is made of LAF3.
Figure 4B:
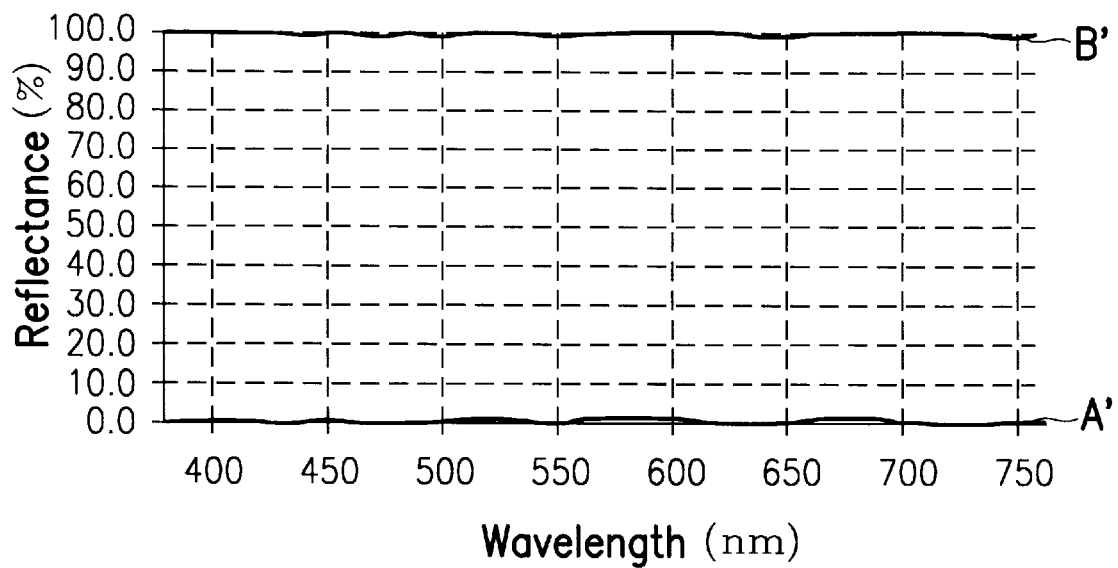
FIG. 4b shows the spectral reflectance of the device shown in FIG. 1c when the prism is made of LAF3.

When the right-angle prism is made of LAF3; and the broad-band polarized multilayer thin-film coated on the internal slope of the right-angle prism is shown as TABLE 2, the spectral transmittance and reflectance are respectively shown in FIG. 4a and FIG. 4b. In FIG. 4a and FIG. 4b, curve A' and curve B' respectively represent p-polarization and s-polarization. The degree of polarization is given by $$P_T=|(0.994-0.002)/(0.994+0.002)|=0.996 \quad \text{Eq(4a)}$$

$$P_R=|(0.006-0.998)/(0.006+0.998)|=0.988 \quad \text{Eq(4b)}$$

TABLE 2

| LAYER NO. | MATERIAL | THICKNESS(nm) | REFRACTIVE INDEX |
|---|---|---|---|
| SUBSTRATE | LAF3 | | 1.73 |
| 1 | SiO$_2$ | 177.25 | 1.46 |
| 2 | TiO$_2$ | 60.06 | 2.44 |
| 3 | SiO$_2$ | 85.22 | 1.46 |
| 4 | TiO$_2$ | 25.68 | 2.44 |
| 5 | SiO$_2$ | 136.35 | 1.46 |
| 6 | TiO$_2$ | 40.79 | 2.44 |
| 7 | SiO$_2$ | 97.21 | 1.46 |
| 8 | TiO$_2$ | 36.38 | 2.44 |
| 9 | SiO$_2$ | 129.59 | 1.46 |
| 10 | TiO$_2$ | 43.86 | 2.44 |
| 11 | SiO$_2$ | 102.89 | 1.46 |
| 12 | TiO$_2$ | 29.97 | 2.44 |
| 13 | SiO$_2$ | 123.54 | 1.46 |
| 14 | TiO$_2$ | 95.75 | 2.44 |
| 15 | SiO$_2$ | 219.46 | 1.46 |
| 16 | TiO$_2$ | 27.20 | 2.44 |
| 17 | SiO$_2$ | 219.55 | 1.46 |
| 18 | TiO$_2$ | 738.28 | 2.44 |
| 19 | SiO$_2$ | 182.91 | 1.46 |
| 20 | TiO$_2$ | 73.16 | 2.44 |
| 21 | SiO$_2$ | 226.85 | 1.46 |

TABLE 2-continued

| LAYER NO. | MATERIAL | THICKNESS(nm) | REFRACTIVE INDEX |
|---|---|---|---|
| 22 | TiO$_2$ | 70.33 | 2.44 |
| 23 | SiO$_2$ | 158.84 | 1.46 |
| INCIDENT MEDIUM | LAF3 | | 1.73 |

First Embodiment

Figure 5:
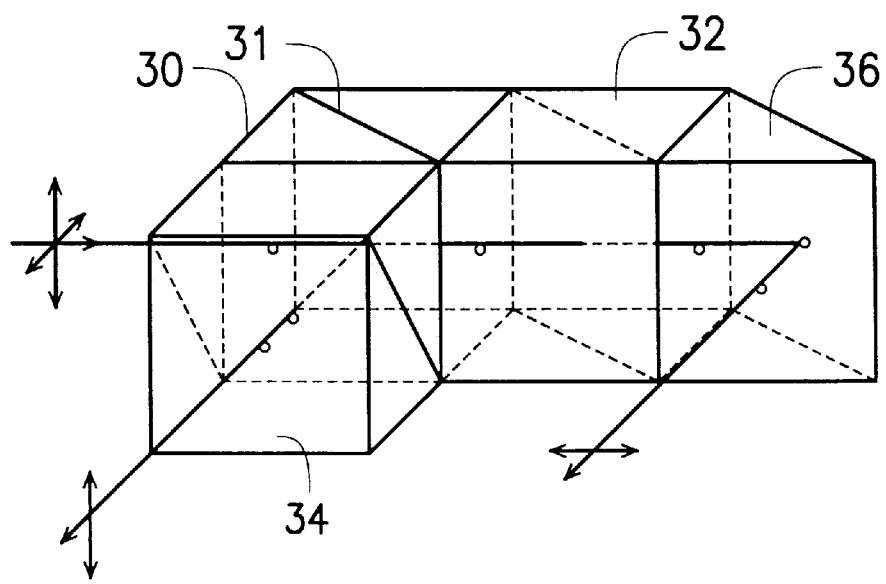
FIG. 5 shows a preferred embodiment according to the present invention.

Now referring to FIG. 5, a first preferred embodiment of the present invention comprises: a first cube-shaped polarizing beam-splitter 30, having an internal slope coated with a broad-band polarized multilayer thin-film 31; a second cube-shaped polarizing beam-splitter 32, having an incident plane adjacent to the plane of emergence of the transmittance beam, and the plane of p-polarization (or s-polarization) parallel with that of the first cube-shaped polarized beam-splitter 30; and a third cube polarizing beam-spitter 34, having an incident plane adjacent to the plane of emergence of the reflected beam, and the plane of p-polarization (or s-polarization) perpendicular to that of the first cube-shaped polarized beam-splitter 30.

In the preferred embodiment, in order to modify the propagating direction of the polarized beam, a right-angle uncoated prism 36 can be placed at the plane of emergence of the transmitted beam from the second cube-shaped polarized beam-splitter 32.

The degrees of polarization of the preferred embodiment made of LAF3 prisms are given by:

$$P_T = |(T_P T_P - T_S T_S)/(T_P T_P + T_S T_S)| \quad \text{Eq (5a)}$$
$$= |(0.988 - 4*10^{-6})/(0.988 + 4*10^{-6})| = 0.99999$$

$$P_R = |(R_S T_P - R_P T_S)/(R_S T_P + R_P T_S)| \quad \text{Eq (5b)}$$
$$= |(0.992 - 12*10^{-6})/(0.992 + 12*10^{-6})| = 0.99998$$

The degree of polarization of the transmitted beam or the reflected beam is extremely high if the preferred embodiment is utilized. If a beam with a higher degree of polarization is desired, the preferred embodiment can be modified to form a 3-stage broad-band multilayer polarized beam-splitter as shown in FIG. 6 or FIG. 7.

Second Embodiment

Figure 6:
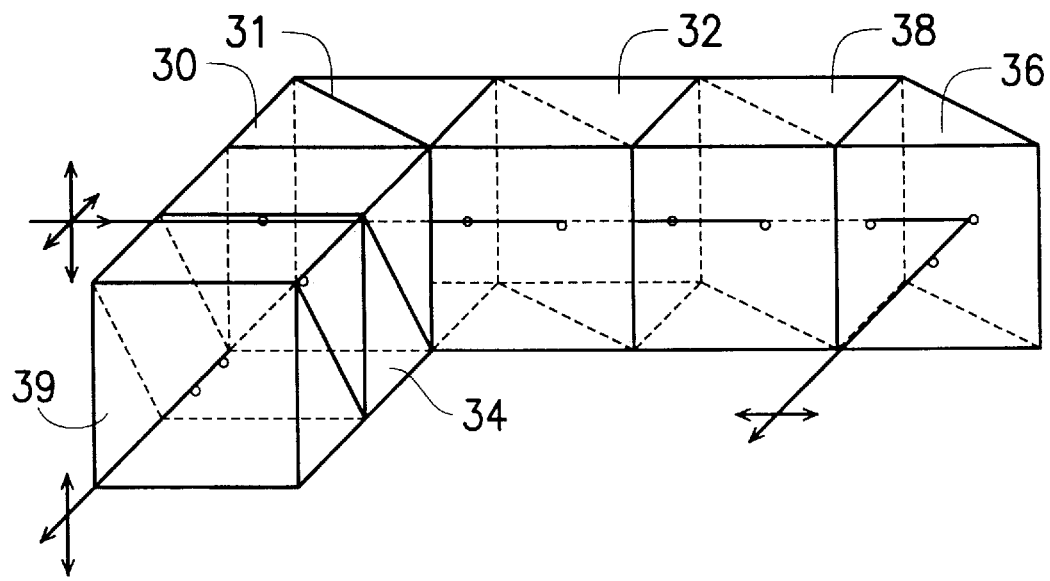
FIG. 6 shows another preferred embodiment according to the present invention.
Figure 7:
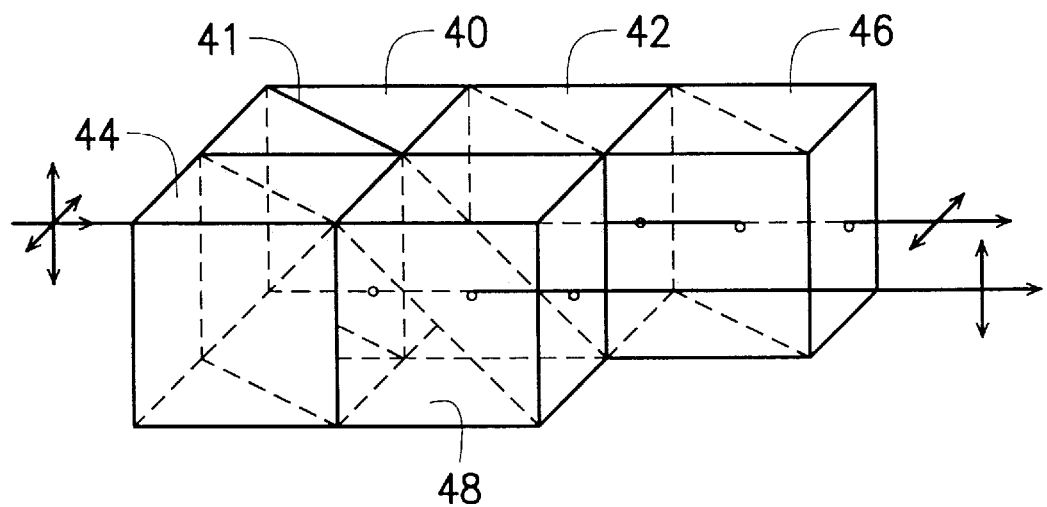
FIG. 7 shows still another preferred embodiment according to the present invention.

Now referring to FIG. 6, a second embodiment of the present invention is a modification of the first embodiment. In other words, a fourth cube-shaped polarized beam-splitter 38 and a fifth cube-shaped polarized beam-splitter 39 are respectively placed on the plane of emergence of the transmitted beam of a second cube-shaped polarized beam-splitter 32 and a third cube-shaped polarized beam-splitter 34. The plane of p-polarization (or s-polarization) of the fourth cube-shaped polarized beam-splitter 38 and the fifth cube-shaped polarized beam-splitter 39 are respectively parallel with that of the second cube-shaped polarized beam-splitter 32 and the third cube-shaped polarized beam-splitter 34.

In the preferred embodiment, in order to modify the porpagating direction of the polarized beam, a right-angle uncoated prism 36 can be placed at the plane of emergence of the transmitted beam from the fourth cube-shaped polarized beam-splitter 38.

Third Embodiment

A third embodiment of a three-stage multilayer broad-band polarized beam-splitter according to the present invention is shown in FIG. 7. The configuration of the third embodiment according to the present invention comprises: a first cube-shaped polarized beam-splitter 40, having an internal slope coated with a broad-band polarized multilayer 41; a second cube-shaped polarized beam-splitter 42, having an incident plane tightly adjacent to the plane of emergence of the transmitted beam of the first cube-shaped polarized beam-splitter 40 and a plane of p-polarization (or s-polarization) parallel to that of the first cube-shaped polarized beam-splitter 40; a third cube-shaped polarized beam-splitter 44, having an incident plane tightly adjacent to the plane of emergence of the reflected beam of the first cube-shaped polarized beam-splitter 40 and the plane of p-polarization (or s-polarization) parallel with that of the first cube-shaped polarized beam-splitter 40; a fourth cube-shaped polarized beam-splitter 46, having an incident plane tightly adjacent to the plane of emergence of the transmitted beam of the second cube-shaped polarized beam-splitter 42 and the plane of p-polarization (or s-polarization) parallel with that of the first cube-shaped polarized beam-splitter 40; and a fifth cube-shaped polarized beam-splitter 48, having an incident plane tightly adjacent with a plane of emergence of the reflected beam of the third cube-shaped polarized beam-splitter 44 and the plane of p-polarization (or s-polarization) perpendicular with that of the third cube-shaped polarized beam-splitter 44.

From the above discussion, it is known that an unpolarized beam is splitted into a transmitted beam and a reflected beam with different polarizations via the first cube-shaped polarized beam-splitter 40. The transmitted beam is transmitted two times via the second cube-shaped polarized beam-splitter 42 and the fourth cube-shaped polarized beam-splitter 46. The reflected beam is reflected via the third cube-shaped polarized beam-splitter 44 and transmitted via the fifth cube-shaped polarized beam-splitter 48. Because each cube-shaped polarized beam-splitter has an internal slope coated with a broad-band multilayer thin-film, the degree of polarization is enhanced via each transmittance or reflection.

In the embodiments, all the cube-shaped polarized beam-splitter are of the same configuration. Furthermore, in one embodiment, each broad-band polarized multilayer thin-film is composed of the same material.

Now referring to FIG. 4a and FIG. 4b, when the wavelength is between 380 nm and 760 nm, the transmittance of p-polarization and the reflectance of s-polarization nearly approach unity. That means the present invention can be suitable in a broader band application. Furthermore, the degree of polarization can be enhanced via applying multi-stage cube-shaped polarized beam-splitters according to the present invention.

What is claimed is:

1. A multilayer thin-film broad-band polarizing beam-splitter, comprising:

a first cube-shaped polarized beam-splitter, having an internal slope coated with a broad-band multilayer thin-film to split an incident beam into a transmitted beam and a reflected beam of different polarizations;

a second cube-shaped polarized beam-splitter, having an incident plane tightly adjacent to a plane of emergence of the transmitted beam of said first cube-shaped polarized beam-splitter and having a plane of p-polarization or s-polarization parallel to that of said first cube-shaped polarized beam-splitter; and a third cube-shaped polarized beam-splitter, having an incident plane tightly adjacent to a plane of emergence of the reflected beam of said first cube-shaped polarized beam-splitter and having a plane of p-polarization or s-polarization perpendicular to that of said first cube--shaped polarized beam-splitter, wherein each of said cube-shaped polarized beam-splitters is made of two isosceles right-angle prisms and said isosceles right-angle prisms are made of LAF3.

* * * * *